UNITED STATES PATENT OFFICE.

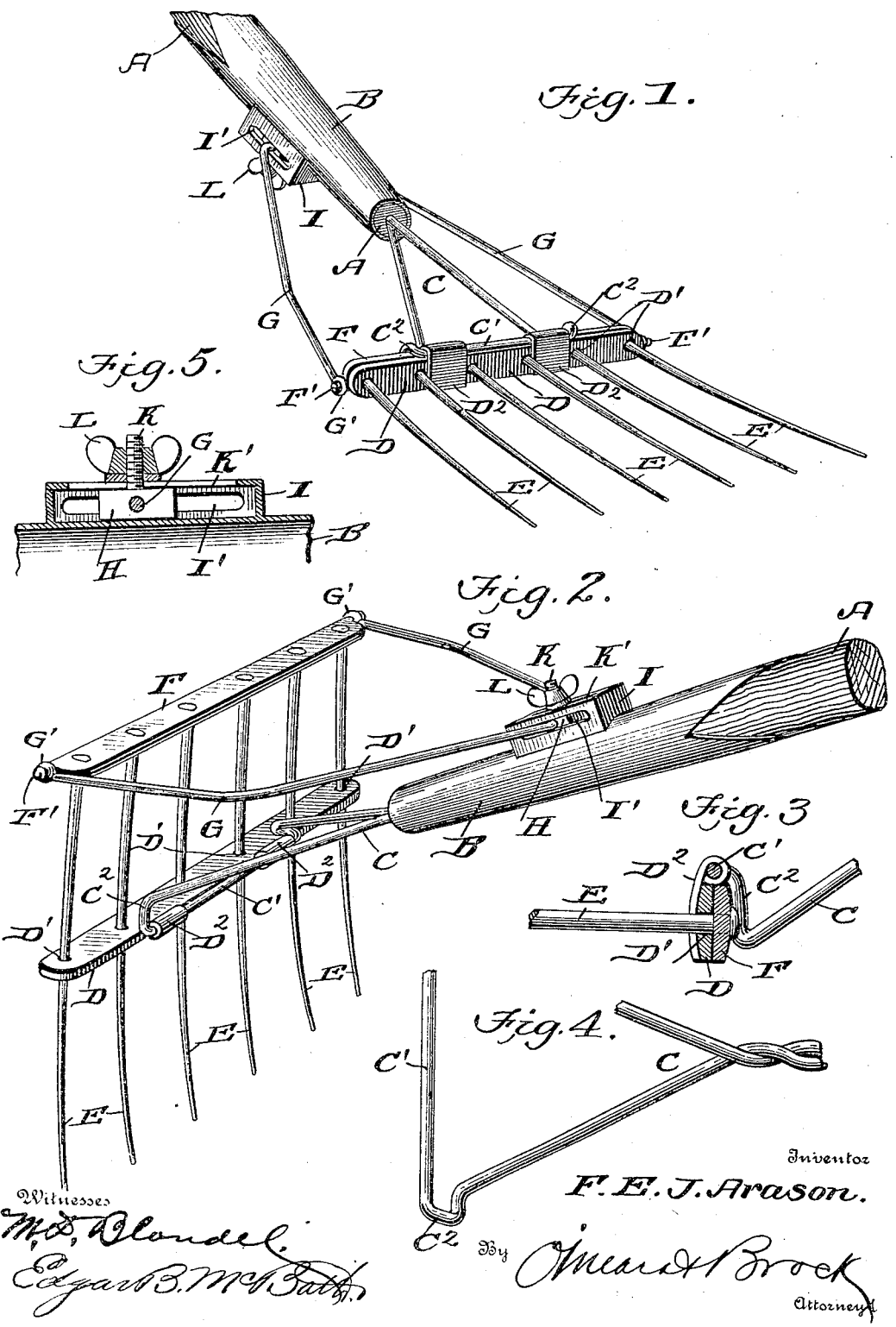

FREDERICK E. J. ARASON, OF MOUNTAIN, NORTH DAKOTA.

COMBINATION RAKE AND FORK.

No. 795,383.  Specification of Letters Patent.  Patented July 25, 1905.

Application filed October 29, 1904. Serial No. 230,548.

*To all whom it may concern:*

Be it known that I, FREDERICK E. J. ARASON, a citizen of the United States, residing at Mountain, in the county of Pembina and State of North Dakota, have invented a new and useful Improvement in a Combination Rake and Fork, of which the following is a specification.

This invention is a combination rake and fork, the object being to provide an exceedingly cheap, simple, durable, and easily-adjusted combination device by means of which hay or grain can be raked and also lifted or tossed by means of one and the same tool or appliance; and with these objects in view the invention consists in the novel features of construction and combination hereinafter fully described, and pointed out in the claims.

In the drawings forming a part of this specification, Figure 1 is a perspective view of the device arranged as a hay-fork. Fig. 2 is a detail perspective view of the device arranged as a rake. Fig. 3 is a detail sectional view showing the position of the tines and cross-bars and supporting-frame when the device is used as a fork. Fig. 4 is a partial detail view of the supporting-frame. Fig. 5 is a sectional view taken through the ferrule and housing and showing the means of locking the adjustable bail.

In constructing a combination-tool in accordance with my invention I employ a handle A, to which the ferrule B is attached, and rigidly fitted in the end of the handle is a triangular-shaped wire frame C, the forward end C' being arranged in advance of the end of the handle and transverse to the length of the handle, and hinged to said forward member C' is a cross-bar D, having apertures D', through which pass the tines E, said tines being rigidly fastened at their upper or rear ends to a cross-bar F, which cross-bar is connected to an adjustable bail G, the ends of the bar F being reduced, as shown at F', and the ends of the bail G having eyes G', which fit upon the reduced ends F' of the cross-bar F. The central portion of the bail G is connected to a block H, which slides in the housing I, having horizontal slots I' in which the bail works, said block having a screw K rigidly connected thereto and projecting through the slots K', produced in the housing I and upon which screws a winged nut L for the purpose of securely locking the sliding block H, and consequently the bail G.

$D^2$ indicates the hinges, by means of which the cross-bar D is pivotally connected to the triangular-shaped frame C, and it will be noted that the same frame is constructed with the shoulders or offset portions $C^2$, against which the cross-bars F and D bear when the device is adjusted as a fork, as most clearly shown in Figs. 1 and 5.

When it is desired to adjust the device as a rake, the position of the handle is reversed and the cross-bars D and F separated, as shown in Fig. 2, and the bail securely locked in position. The device can then be used as an ordinary rake, and whenever it is desired to readjust the device as a fork it is only necessary to loosen the winged nut, shift the position of the bail and also the cross-bar F, bringing the bars D and F together and in engagement with the shouldered ends of the triangular-shaped frame, and then by tightening the nut the device is ready for use as a fork.

Having thus fully described my invention, what I claim as new, and desire to secure by Letters Patent, is—

1. A device of the kind described comprising a frame, an apertured cross-bar pivotally connected to the forward end of the frame, an adjustable cross-bar carrying a series of tines adapted to pass through the apertured bar together with means for adjusting and locking the last-mentioned cross-bar as set forth.

2. In a device of the kind described, a frame connected to a handle, an apertured cross-bar hinged to the forward end of said frame, the cross-bar carrying a series of tines which are adapted to pass through the apertured cross-bar, a bail connected to the ends of the tine-carrying bar, and means arranged upon the handle for adjusting and securing the said bail, as set forth.

3. In a device of the kind described, the combination with a handle, of a triangular-shaped frame connected thereto, an apertured cross-bar pivoted to said frame, a cross-bar carrying a series of tines, a bail pivotally connected to the ends of said tine-carrying bar, a housing arranged upon the handle and having an adjustable block arranged therein to which the central portion of the bail is connected and means for locking said block, as set forth.

4. In a device of the kind described, the combination with the handle and ferrule, of the triangular-shaped frame having shoulders at its forward end, the apertured cross-bar hinged to the forward end of said frame, the tine-carrying cross-bar, the bail pivotally connected to the ends of said tine-carrying cross-bar, a housing arranged upon the ferrule and having slotted sides and top, a block sliding therein and through which the central portion of the bail passes, a screw carried by said block, and a thumb-nut arranged on the said screw.

FREDERICK E. J. ARASON.

Witnesses:
H. T. HJALTALIN,
H. H. KEYKJALIN.